US006948161B2

(12) United States Patent
Bera (10) Patent No.: US 6,948,161 B2
(45) Date of Patent: Sep. 20, 2005

(54) METHOD, COMPUTER SYSTEM AND COMPUTER PROGRAM PRODUCT FOR DETERMINING THE EQUIVALENCE OF TWO BLOCKS OF ASSIGNMENT STATEMENTS

(75) Inventor: Rajendra Kumar Bera, Jeevan Beema Nagar Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 09/839,071

(22) Filed: Apr. 20, 2001

(65) Prior Publication Data

US 2002/0184617 A1 Dec. 5, 2002

(51) Int. Cl.[7] .................................................. G06F 9/45
(52) U.S. Cl. ....................... 717/151; 717/141; 717/142; 717/154
(58) Field of Search ............................... 717/126, 140, 717/141, 146, 124, 151, 159, 142, 127, 154, 158; 708/166, 671

(56) References Cited

U.S. PATENT DOCUMENTS

| | | | | |
|---|---|---|---|---|
| 4,692,896 A | * | 9/1987 | Sakoda et al. ............... | 717/142 |
| 5,666,533 A | * | 9/1997 | Horiguchi et al. .......... | 718/100 |
| 6,026,235 A | * | 2/2000 | Shaughnessy ................ | 717/127 |
| 6,182,284 B1 | * | 1/2001 | Sreedhar et al. ............ | 717/146 |
| 6,286,135 B1 | * | 9/2001 | Santhanam ................... | 717/146 |
| 6,292,168 B1 | * | 9/2001 | Venable et al. ............. | 345/605 |
| 6,415,433 B1 | * | 7/2002 | Callahan et al. ............ | 717/160 |
| 6,427,234 B1 | * | 7/2002 | Chambers et al. .......... | 717/140 |
| 6,654,953 B1 | * | 11/2003 | Beaumont et al. .......... | 717/158 |
| 6,721,941 B1 | * | 4/2004 | Morshed et al. ............ | 717/127 |
| 6,745,384 B1 | * | 6/2004 | Biggerstaff ................. | 717/156 |

OTHER PUBLICATIONS

TITLE: Global Value Numbers and Redundant Computations, author. Rosen et al, ACM, 1988.*

* cited by examiner

Primary Examiner—Chameli C. Das
(74) Attorney, Agent, or Firm—Schmeiser, Olsen & Watts; William H. Steinberg (57) ABSTRACT

The present invention discloses a method for determining, in a computer environment, the equivalence, if any, of two blocks of assignment statements in a computer program for use in compiler optimization of source code, program verification, program proving, and like computing tasks. The method, inter alia, successfully eliminates, from a block of assignment statements, all intermediate variables and statements which are identities and also those which are irrelevant to the computation of the output variables and brings the block to a form suitable for comparing two or more blocks of assignment statements. A system for carrying out the above method and a computer program product incorporating the method are also disclosed.

7 Claims, 3 Drawing Sheets

METHOD, COMPUTER SYSTEM AND COMPUTER PROGRAM PRODUCT FOR DETERMINING THE EQUIVALENCE OF TWO BLOCKS OF ASSIGNMENT STATEMENTS

BACKGROUND OF THE INVENTION

The present invention relates to the determination of the equivalence of two blocks of assignment statements, such as those used in computer programs. The invention provides a method and computer system for carrying out such a determination and also to a computer program product including a computer readable medium having recorded thereon a computer program for performing such determination.

An assignment statement assigns the value of an expression, the right-hand side of the statement, to a variable at the left-hand side of the statement The two sides of the statement are connected by an assignment operator, which in many programming languages (including C and C++) is the equals sign (=). Thus, an example of an assignment statement in a programming language such as C might be x=x+4. The interpretation of the assignment operator (=) in this statement is: take the current value of x (say, 3), add 4 to it and assign the result (7) to x as its new value. This operation is very different from the interpretation of the equal sign in algebra where the statement x=x+4 would be meaningless since in algebra it is used to express an equation and not an assignment. In some programming languages the assignment operator is given the symbol (:=) to avoid confusion between the assignment and equation.

The present invention has for its object, a technique which is specifically relevant to the determination of whether or not two blocks of assignment statements are equivalent. By way of example, such a technique is useful in realising intermediate steps in program verification, program proving, and compiler initiated optimisation of source code. Expressed mathematically, the objective is as follows:

Given, (1) a set of input variables $\{x_1, x_2, \ldots x_m\}$ and a set of output variables $\{x_k, x_k+1, \ldots x_n\}$ with an overlap of variables in the two sets given by the set $\{x_k, x_{k+1}, \ldots x_m\}$ if $k \leq m$, and (2) two blocks of assignment statements $B_1$ and $B_2$ where $B_1$ comprises the set of assignments $\{^1S_1, ^1S_2, \ldots ^1S_M\}$ and $B_2$ comprises the set of assignments $\{^2S_1, ^2S_2, \ldots ^2S_N\}$, determine if the two blocks $B_1$ and $B_2$ provide equivalent computations for the output variables.

The term equivalent computation here means that the values for the output variables $\{x_k, x_{k+1}, \ldots, x_n\}$ produced by $B_1$ are identical to those produced by $B_2$ given the input variables $\{x_1, x_2, \ldots, x_m\}$ even if the sets $\{^1S_1, ^1S_2, \ldots ^1S_M\}$ and $\{^2S_1, ^2S_2, \ldots, ^2S_N\}$ are not identical. For example, given the input variables $\{x_1, x_2, x_3\}$ and output variables $\{x_2, x_3, x_4\}$, block $B_1$ might comprise the assignment statements:

$x_5=x_1$ $x_6=3^*x_2$ $x_3=x_1+3^*x_2$ $x_1=x_1+x_2+x_2$ $x_2=2$ $x_1=x_1$ $x_4=x_5+x_6$ while block $B_2$ comprises the statements:

$x_1=x_1+2^*x_2$ $x_3=x_1+x_2$ $x_4=x_3$ $x_2=2$

Inspection will reveal that, in either case, the output variables $\{x_2, x_3, x_4\}$ will produce the same computed values.

SUMMARY OF THE INVENTION

The invention provides a computer implemented method for determining, in a computer environment, the equivalence, if any, of two blocks of assignment statements in a computer program, for use in compiler optimisation of source code, program verification, program proving, and like computing tasks, said method comprising the steps of:

(a) forming, for each block of assignment statements, a corresponding array, each array comprising a plurality of elements corresponding to respective ones of the statements and populating the elements with attributes of the statements including the expression at the right-hand side of the statement;

(b) processing, in each array, each assignment statement in turn, in the order from the last statement to the first, the processing comprising the inspection of each unprocessed assignment statement in turn, in the order from the last unprocessed assignment statement to the first, to determine if the variable appearing on the left-hand side of the unprocessed assignment statement appears on the right-hand side of the assignment statement being processed;

(c) during step (b), in each array, if the variable appearing on the left-hand side of the unprocessed assignment statement also appears on the right-hand side of the assignment statement being processed, replacing all occurrences of such variable on the right-hand side of the assignment statement being processed, non-recursively, by the right-hand side of the said unprocessed assignment statement;

(d) forming, from each array, a corresponding new block of assignment statements comprising the statements processed according to steps (b) and (c) less any statements which, after processing, is either an identity (the left and right sides of the statement are identical) or whose left-hand side variable is not one of the output variables;

(e) creating, from each new block of assignment statements, a corresponding new array, each array comprising a plurality of elements corresponding to respective ones of the statements and populating the elements with attributes of the statements including the expression at the right-hand side of the statement;

(f) sorting, in each new array, the array elements in alphabetical order using the output variable name as the key.

(g) comparing the arrays to detect the equivalence of two blocks of assignment statements.

The method, inter alia, successfully eliminates, from a block of assignment statements, all intermediate variables and statements which are identities and also those which are irrelevant to the computation of the output variables and brings the block to a form suitable for comparing two or more blocks of assignment statements.

The invention also provides an apparatus adapted to determine, in a computer environment, the equivalence, if any, of two blocks of assignment statements in a computer program, for use in compiler optimisation of source code, program verification, program proving, and like computing tasks, said apparatus comprising:

(a) forming means for forming, for each block of assignment statements, a corresponding array, each array comprising a plurality of elements corresponding to respective ones of the statements and populating the elements with attributes of the statements including the expression at the right-hand side of the statement;

(b) processing means for processing, in each array, each assignment statement in turn, in the order from the last statement to the first, the processing comprising the inspection of each unprocessed assignment statement in turn, in the order from the last unprocessed assignment statement to the first, to determine if the variable appearing on the left-hand side of the unprocessed assignment statement appears on the right-hand side of the assignment statement being processed;

(c) during step (b), in each array, if the variable appearing on the left-hand side of the unprocessed assignment statement also appears on the right-hand side of the assignment statement being processed, replacement means for replacing all occurrences of such variable on the right-hand side of the assignment statement being processed, non-recursively, by the right-hand side of the said unprocessed assignment statement;

(d) forming means for forming, from each array, a corresponding new block of assignment statements comprising the statements processed according to steps (b) and (c) less any statements which, after processing, is either an identity (the left and right sides of the statement are identical) or whose left-hand side variable is not one of the output variables;

(e) creation means for creating, from each new block of assignment statements, a corresponding new array, each array comprising a plurality of elements corresponding to respective ones of the statements and populating the elements with attributes of the statements including the expression at the right-hand side of the statement;

(f) sorting means for sorting, in each new array, the array, elements in alphabetical order using the output variable name as the key.

(g) comparison means for comparing the arrays to detect the equivalence of two blocks of assignment statements.

The invention further provides a computer program product including a computer readable medium having recorded thereon a computer program for determining, in a computer environment, the equivalence, if any, of two blocks of assignment statements in a computer program, for use in compiler optimisation of source code, program verification, program proving, and like computing tasks, said program comprising:

(a) forming process steps for forming, for each block of assignment statements, a corresponding array, each array comprising a plurality of elements corresponding to respective ones of the statements and populating the elements with attributes of the statements including the expression at the right-hand side of the statement;

(b) processing steps for processing, in each array, each assignment statement in turn, in the order from the last statement to the first, the processing comprising the inspection of each unprocessed assignment statement in turn, in the order from the last unprocessed assignment statement to the first, to determine if the variable appearing on the left-hand side of the unprocessed assignment statement appears on the right-hand side of the assignment statement being processed;

(c) during step (b), in each array, if the variable appearing on the left-hand side of the unprocessed assignment statement also appears on the right-hand side of the assignment statement being processed, replacement steps for replacing all occurrences of such variable on the right-hand side of the assignment statement being processed, non-recursively, by the right-hand side of the said unprocessed assignment statement;

(d) forming process steps for forming, from each array, a corresponding new block of assignment statements comprising the statements processed according to steps (b) and (c) less any statements which, after processing, is either an identity (the left and right sides of the statement are identical) or whose left-hand side variable is not one of the output variables;

(e) creation process steps for creating, from each new block of assignment statements, a corresponding new array, each array comprising a plurality of elements corresponding to respective ones of the statements and populating the elements with attributes of the statements including the expression at the right-hand side of the statement;

(f) sorting process steps for sorting, in each new array, the array elements in alphabetical order using the output variable name as the key.

(g) comparison process steps for comparing the arrays to detect the equivalence of two blocks of assignment statements.

The present invention relates to determining if two syntactically correct blocks of assignment statements in a computer program are equivalent or not. Equivalence among more than two blocks of assignment statements may be determined by pair-wise comparison of the blocks.

Among its applications are compiler initiated optimisation of source code, where it is desirable to recognise multiple occurrences of blocks of assignment statements producing identical output so tat such blocks can be evaluated once, and the result used in all the remaining instances.

BRIEF DESCRIPTION OF THE DRAWINGS

For a better understanding of the invention, reference will be made, by way of example, to the accompanying drawings, in which.

DETAILED DESCRIPTION

Figure 1:
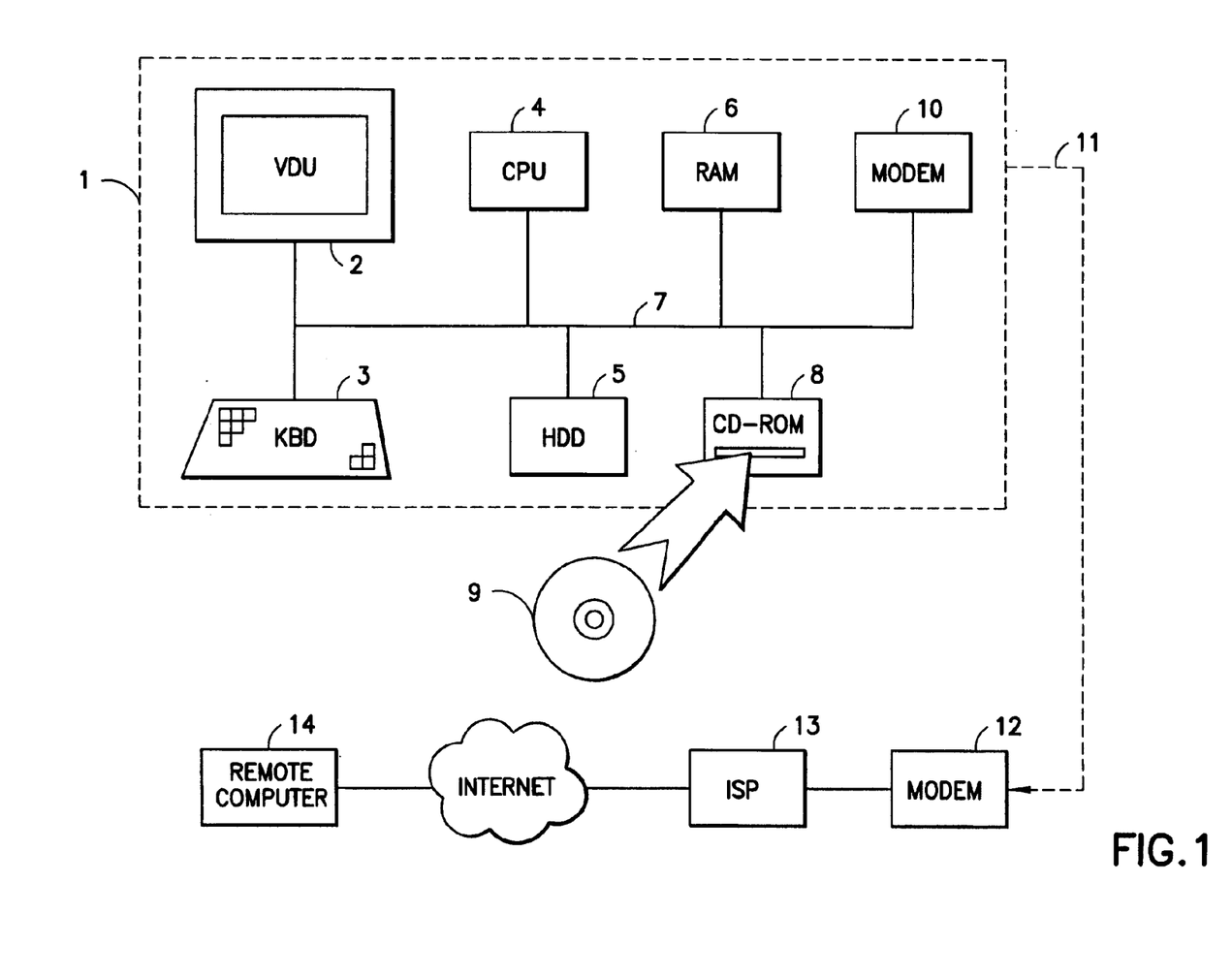
FIG. 1 is a simplified diagram of a computer system.

The invention includes a method for determining the equivalence of two blocks of assignment statements such as might be found in a computer program The method may be implemented as a program for a computer, and the program may be stored on a storage medium, for example a CD-ROM, to form a program product according to the invention. Alternatively, a program product according to the invention may comprise a program made available for downloading from another computer. The computer program can be loaded into or made available to a suitable computer to form a computer system of the invention. FIG. 1 shows one embodiment of such a computer system.

This embodiment comprises a so-called stand-alone computer, i.e. one that is not permanently linked to a network. It includes a display monitor 2, a keyboard 3, a microprocessor-based central processing unit 4 a hard-disc drive 5 and a random access memory 6 all coupled one to another by a connection bus. The keyboard 3 is operable for enabling the user to enter commands into the computer along with user data. As well as keyboard 3, the computer may comprise, a mouse or tracker ball (not shown) for entering user commands especially if the computer is controlled by an operating system with a graphical user interface.

To load program instructions into the memory 6 and/or store them on the disc drive 5 so that the computer begins to operate or to become operable in accordance with the present invention, the computer 1 comprises a CD-ROM drive 8 for receiving a CD-ROM 9.

The program instructions are stored on the CD-ROM 9 from which they are read by the drive 8. However, as will be well understood by those skilled in the art, the instructions as read by the drive 8 may not be usable directly from the CD-ROM 9. Instead, they may be loaded into the memory 6 and stored in the hard disc drive 5 and used by the computer 1 from there. Also, the instructions may need to be decompressed from the CD-ROM using appropriate decompression software on the CD-ROM or in the memory 6 and may, in any case, be received and stored by the computer 1 in a sequence different to that in which they are stored on the CD-ROM.

In addition to the CD-ROM drive 8, or instead of it any other suitable input means could be provided, for, example a floppy-disc drive or a tape drive or a wireless communication device, such as an infrared receiver (none of these devices being shown).

The computer 1 also comprises a telephone modem 10 through which the computer is able temporarily to link up to the Internet via telephone line 11, a modem 12 located at the premises of an Internet service provider (ISP), and the ISP's computer 13. Also connected to the Internet are many remote computers, such as the computer 14, from which information, software and other services are available for downloading to the computer 1. Furthermore, the computer 1 does not have to be in a stand-alone environment. Instead, it could form part of a network (not shown) along with other computers to which it is connected on a permanent basis. It could also be permanently coupled to or have a temporary link to an intranet. An intranet is a group of data holding sites similar to Internet sites and arranged in the same way as the Internet but accessible only to particular users, for example the employees of a particular company. Instead of modem 10, the computer 1 could have a digital hard-wired link to the ISP's computer 13 or the computer 1 could itself comprise a permanently connected Internet site whether or not acting as an ISP for other remote users. Instead of the invention being usable only through the local keyboard 3, it may be available to remote users working through a temporary or permanent link to computer 1 acting as ISP or simply as an Internet site.

Thus, instead of being provided by a local device such as the CD-ROM drive 8, the program instructions could be received or made available via the Internet from a remote computer such as the computer 14. Alternatively, the instructions could be received or made available from a computer connected with computer 1 via a network such as an intranet.

To carry out the method of the invention, the computer 1 is loaded with a suitable operating system, a compiler including a section for carrying out the method, or simply a specific utility for carrying out that method, and a section of source code which, it is assumed, contains the two sets of assignment statements of which the equivalence is to be determined. The compiler/utility is supplied to computer 1 from a portable storage medium such as a series of floppy discs (not shown) or a CD-ROM or from another computer such as the computer 14.

The method will now be described by reference to the three flow charts of FIGS. 2, 3 and 4. The numbered "steps" noted herein correspond to the step numbers of the flow charts.

Figure 2:
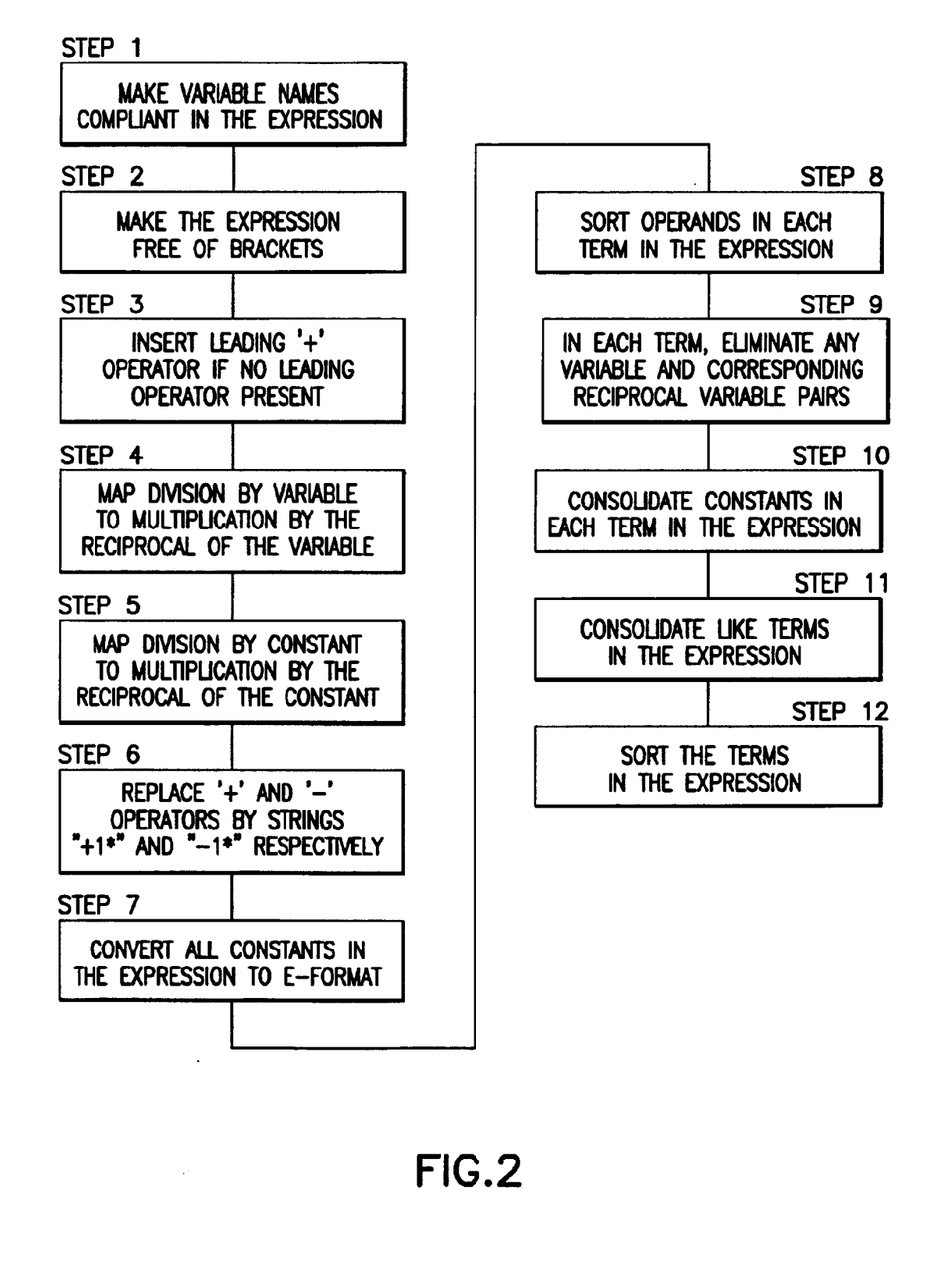
FIGS. 2 and 3 are flow-charts for explaining the method of the invention.

Referring first to FIG. 2, the two sets of assignment statements are identified in the relevant source code and then, to facilitate the analysis, each assignment statement is now reduced to a standardised format according to a predetermined set of rules as follows:

Step 1: Make Variable Names Compliant

Initially, it is assumed that the statement is syntactically correct and does not contain any blanks. In the preferred embodiment, variable names appearing in the statement may comprise only lower-case alphabet characters, the underscore character, and digits. Also, a variable name may not start with a digit or end with an underscore. If these construction rules are not met, then the affected variable names are mapped (aliased) to alternative, but distinct, names obeying the construction rules, and these new names used instead. The right-hand side expression of the statement is then subjected to the following steps 2 to 12.

Step 2: Remove Brackets

Brackets, if present, in the expression must be removed by carrying out the necessary operations needed to remove them, such as multiplying two parenthesised factors, discarding superfluous brackets, and so on.

Step 3: Insert Leading Operator if None Present

The expression is put in the following form:

<unitary operator><operand><operator><operand> . . .

<operator><operand> where the unitary operator is either +(plus) or −(minus), and each operator is one of +(plus), −(minus), * (multiplication) or/(division). In the event that an expression does not commence with a unitary operator, one is added, i.e. a unitary operator +(plus) is inserted at the start of the expression. For example:

a*b/c becomes +a* b/c

Step 4: Map Division by Variable to Multiplication by Reciprocal of Variable

Division by a variable, for example, the operator operand pair /x, is replaced by multiplication by the reciprocal of the variable, where the reciprocal of the variable is formed as a new variable by appending an underscore to the variable, i.e. /x is replaced by *x_ in the case of the given example.

Step 5: Map Division by Constant to Multiplication by Reciprocal of Constant

Division by a constant, for example /5, is replaced by multiplication by the reciprocal of the constant, i.e., /5 is replaced by *0.2 in the case of the given example.

Step 6: Replace "+" and "−" by Strings "+1*" and "−1*"

Next all +(plus) operators are substituted with the string "+1*" so that "+" becomes "+1*". Similarly, all − (minus) operators are substituted with the string "−1*" so that "−" becomes "−1*". Thus, for example:

+x becomes +1*x and

−x*y+z becomes −1*x*y+1*z

Step 7: Convert Constants to E-Format

Next the operands, which are constants (including the 1's introduced in the previous step) are converted into an e-format as follows:

".[unsigned number]e[e-sign][unsigned exponent]"

where: [unsigned number] is an n-digit number comprising only digits and n is a predetermined fixed integer greater than 0; [e-sign] is the sign of the exponent and is one of > for plus or < for minus; and [unsigned exponent] is an m-digit number comprising only digits and m is a predetermined fixed integer greater than 0.

Thus, for example:

$25=0.25*10^2$ becomes $0.250000e>02$ and $0.025=0.25*10^{-1}$ becomes $0.250000e<01$ where we have assumed n=6 and m=2. It is noted that any constant will be represented by a string of constant length m+n+3 characters in the e-format. Here e[e-sign] [unsigned exponent] represents the quantity 10 raised to the power [e-sign] [unsigned exponent], which must be multiplied to the number represented by. [unsigned number] to get the actual constant.

Now, the expression is free of the division operator and will contain at least one operand which is a constant Each term in this expression will therefore have the following form:

<unitary operator><operand><*><operand> . . . <*><operand> where the unitary operator is either +(plus) or –(minus), and between two consecutive operands is the multiplication operator *. After the terms are identified, the [e-sign] of each constant is restored from < or > to – or + respectively.

Step 8: Sort Operands in Each Term

In each term the operands are sorted (rearranged) in ascending order according to their ASCII value. This rearrangement is entirely permissible because the multiplication operator is commutative, i.e. the exchange of operands does not affect the result.

It is noted that no other variable will be able to place itself in the rearrangement between any particular variable and its reciprocal if they are both present. For example, if the variable "a" and its reciprocal "$a_{13}$" are both present, they will be sorted so as to remain together as "*a*a__".

Step 9: Eliminate Variable/Reciprocal Pairs

In the next step, all operator-operand sequences of the form "*a*a__" are eliminated from the term. For example, the expression $a^3/a^2$ will appear as "*a*a*a*a__*a__". After "*a*a__" has been eliminated from it, "*a*a__" will remain, from which "*a*a__" must, again, be eliminated That is, the elimination process must be continued till no further elimination is possible.

Step 10: Consolidate Constants in Each Term

After sorting, the operands which are constants will be bunched up at the beginning of the terms where they can be easily identified and replaced by a single constant Thus, for example:

+0.100000e+01*s*k*m*s__*0.500000e+00 after arranging the operands in ascending order becomes

+0.100000e+01*0.500000e+00*k*m*s*s__ and after eliminating the units s and s__and consolidating the constants, the term becomes +0.500000e+00*k*m At this stage a term will have the following form:
<unitary operator><constant><* ><operand> . . . <*><operand> where each operand is a variable name, whose ASCII value is not lower than that of its preceding operand, if any. This is the reduced form of a term. In the reduced form, the non-constant part of a term is called a variable-group. For example, if the term in the reduced form is "+0.250000e+01*m*m*s", then its variable-group is "*m*m*s".

Step11: Consolidate Like Terms

In an expression, all those terms whose variable-groups match, are combined by modifying the constant in one of the terms, and eliminating the others.

Step 12: Sort Terms in the Expression

Finally, the reduced terms in the expression are rearranged in an ascending order according to the ASCII value of their respective variable-groups. In this final form, the expression is said to be in its reduced form Note, in particular, that no two terms in a reduced expression will have the same variable-group.

Having obtained the reduced right-hand side expressions, the method continues by carrying out certain array processing operations as will be described. For convenience, conventions and data structures similar to those used in the C/C++ programming language have been used in the following part of the description. However, the invention is not specific to the C/C++ programming languages.

To extract certain attributes of an assignment statement S, expressed as v=e, there is defined a data structure D with elements v, e, p, d, u, nVars, tag. Here v is the variable appearing on the left-hand side of the statement; e is the right-hand side expression; p is the list of the variables appearing in e; d is the sublist of variables from p, which have appeared on the left-hand side of an earlier assignment statement; u is the list of; as yet, undefined variables in e; nVars is the number of variables (defined or undefined) appearing in p, and tag has the value –1 if the assignment is an identity, 0 if e is a constant value, 1 if v does not appear in p, 2 if v appears in p. In the programming language C/C++, the data structure could be expressed as:

```
struct_EQ_ATTRIBS{
    char *v;      //lhs variable
    char *e;      //rhs expression
    char *p;      //list of rhs variables in equation
    char *d;      //list of rhs variables defined by one or more previous
                  //assignments
    char *u;      //list of undefined variables in rhs expression
    int n Vars;   //number of variables in p
    int tag;      //equation tag; –1 (identity), 0 (rhs = const),
                         1 (non-recursive),
                  //2(recursive)
} D;
```

Further, there is created from a given block of assignment statements B, an array of the structure _EQ_ATTRIBS, D, expressed in a standard form. A property of this standard form is that, for a given input variables set, if two blocks of assignment statements $B_1$ and $B_2$ produce identical expressions for corresponding output variables for the output variables set, then they will also produce a common D.

Figure 3:
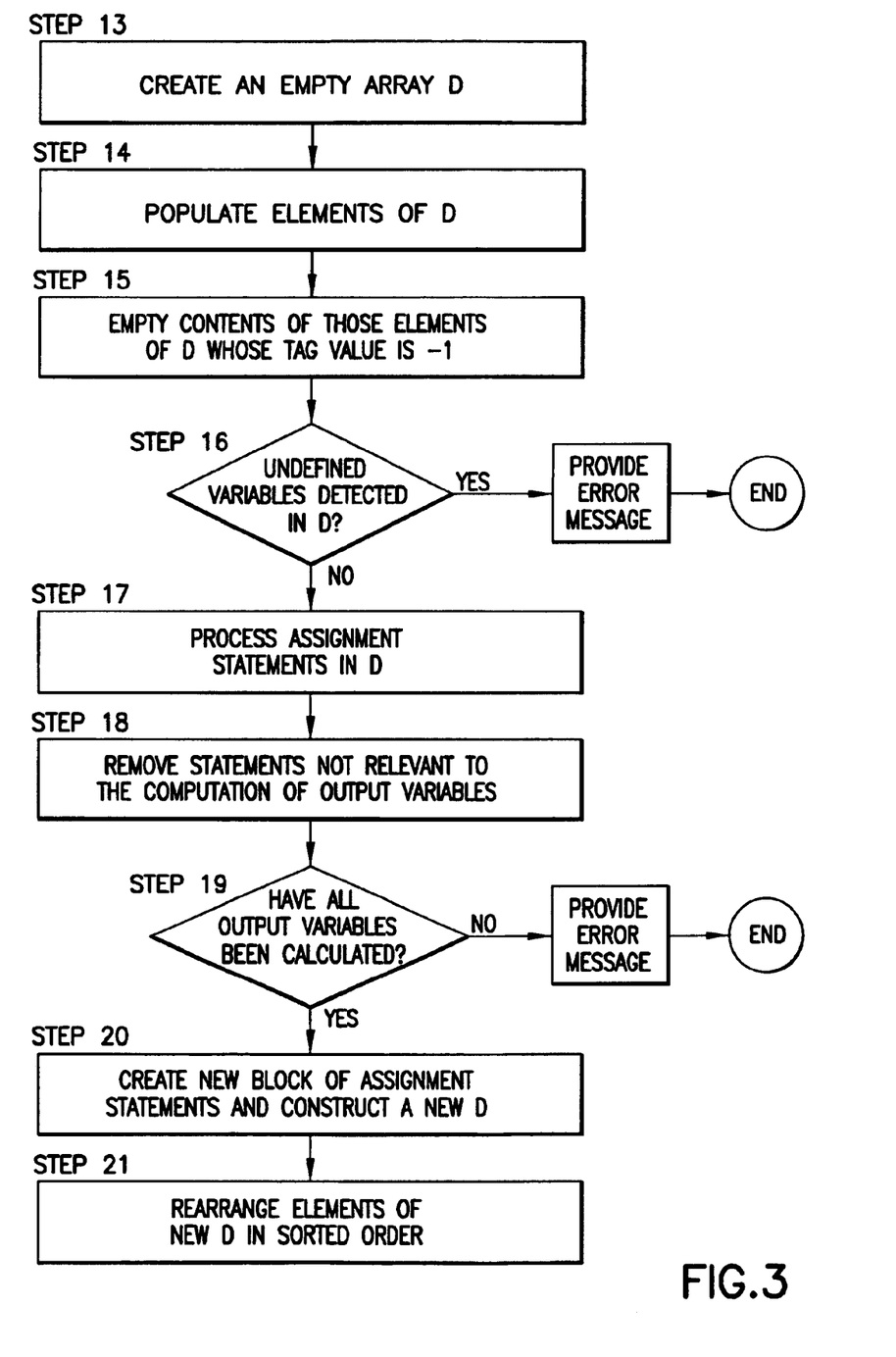

Referring now to FIG. 3 in turn, the array processing operations comprise the following steps:

Step 13. If M is the total number of statements in B, create the empty array D of dimension M. Let the i-th element of D be given by $D[i]=(v_i, e_i, p_i, d_i, u_i, nVars_i, tag_i)$.

Step 14. For every $S_i$ in B, determine its attributes. Let D[i] contain the attributes of $S_i$. Note that a variable is undefined in $S_i$ if it does not appear in either the input variables set or as a left-hand side variable in any previous assignment statement. All such undefined variables ate placed in the element $u_i$ of D[i]. Then arrange the variables in the lists $p_i$ and $d_i$ in ascending order according to the ASCII value of the variables, placing only a comma between variables to separate them from each other. This is done to facilitate comparisons between similar entities by means of string comparison.

Step 15. For every $S_i$ in B, determine if it is an identity (its tag value will be −1). If it is an identity, mark the statement for elimination from B (say, by emptying the contents of D[i]).

Step 16. For every $S_i$ in B, check if it has one or more undefined variables.(i.e. its $u_i$ is non-empty). If such a statement is found, terminate the algorithm with the message that the block of statements B has one or more undefined variables along with the list of the undefined variables collected in $u_i$, for each of the statements in B.

Step 17. Begin with the last statement $S_M$ in B and move up to the first statement $S_i$. For every $S_i$, check if its $d_i$ is non-empty. If it is non-empty define an index j. Begin with j =i−1(with j>1) and go backwards to j=1. For each $v_j$ appearing in $S_i$, replace $v_j$ by its corresponding $e_j$. Note that this is a string replacement and to carry it out with semantic correctness $e_j$ must be enclosed within the parentheses "( )". That is, replace the string, which represents v, with the string "($e_j$)" where $e_j$ is the string representation of the right-hand side of $S_j$. Further, after the replacement, ensure that if $v_j$ reappears in "($e_j$)", it is left untouched (since it would belong to the left-hand side of a still earlier assignment statement). This is easily done, for example, by scanning from left to right the expression $e_i$ and after every replacement of $v_j$ moving the pointer to the right of ')' of "($e_j$)". This ensures that any $v_j$ appearing in the assignment now will be correctly replaced by its corresponding $e_j$ as we go up the index j towards 1. After operation with j=1 is completed, mark $S_i$ for deletion if it reduces to an identity after the replacements are completed, otherwise empty out $p_i$, $d_i$, $u_i$, nVars$_i$, tag$_i$ (if not already empty) since they are no longer relevant. Step 17 is a crucial step, and will need to be coded carefully. The right-hand sides of the statements remaining will contain only the input variables and those output variables, which have appeared on the left-hand side of a previous assignment statement.

Step 18. Renumber the statements in B, skipping all statements marked for deletion but otherwise maintaining their sequence. Let these be $S_i$ to $S_r$. (Note: r≠M, if identities were found in steps 15 and 17. The number of identities found will be M−r). Define a current output variables list and copy the variables in the output variables set into it. Begin with j=r and move backwards to j=1. For every $S_j$, check if its $v_j$ is in the current output variables list. If it is, retain the statement in B and delete the variable v. from the current output variables list. If it is not, mark the statement for deletion from B by emptying out its entries in D[j]. Note that at the end of this step all intermediate variables (i.e. variables, which are neither input variables nor output variables) would have been eliminated from B. So would also statements which do not contribute to the computation of the output variables set.

Step 19. If, at the end of step 18, the current output variables list is not empty, terminate the algorithm with the message that some output variables have not been calculated and list those variables (these will be the variables remaining in the current output variables list). Otherwise move to step 20.

Step 20. At this stage, the number of assignment statements left in B will be equal to the number of variables (n−k+1) in the output variables set. Destroy B. Recreate the assignment statements of a new B, in the sequence they appear in D (skipping those which were marked for deletion in step 18), by concatenating the strings v, e, and the character '=' in the form 'v=e'. Destroy D. Construct a new D for the (n−k+1) assignment statements.

Step 21. Rearrange the (n−k+1) data structures in D in alphabetical order using v as the key. This is the final standard form of D for the original set of the assignment statements.

If two blocks of assignment statements $B_1$ and $B_2$ each produces the same D, then their output variables will obviously produce the same values of execution.

The algorithm as described above eliminates, from a block of assignment statements, all intermediate variables and statements which are identities and also those which are irrelevant to the computation of the output variables. It retains only those statements, which assign final values to the output variables. Since the attributes of each of the statements (contents and it's hierarchical position in B) is preserved in the array D, each element D[i] is self-contained and can be read in any order. Therefore D can be sorted as a list and put into a desired standard form.

As an example of the operation of the algorithm, the first block of assignment statements mentioned in the background section of this specification are used, namely:

$x5=x1$ $x6=3*x2$ $x3=x1+3*x2$ $x1=x1+x2+x2$ $x2=2$ $x1=x1$ $x4=x5+x6$

To this, the steps of the algorithms are applied as shown below:

Each statement is reduced according to steps 1 to 12. For illustration, one statement, namely x3=x1+3*x2, will be reduced.

Step 1

To make variables compliant, they are mapped to x3, x1 and x2 respectively. The right-hand side of the statement, ie x1+3*x2 is then subject to rules 2 to 12.

Step 2

There are no brackets.

Step 3

A leading operator is added to give +x1+3*x2.

Steps 4 and 5

There are no division operators.

Step 6

Plus and minus operators are replaced by "+1 *" and "−1*" to give +1 *x1+1*3*x2.

Step 7

Put constants in e-format

+0.100000e>01*x1+0.100000e>01*0.300000e>01 *x2

Thus, the expression has two terms +0.10000e>01*x1 and +0.100000e>01*0.300000e>01*x2. Having identified the two terms, the e-signs of the constants are restored to give +0.10000e+01*x1 and +0.100000e>+01 *0.300000e+01*x2.

Steps 8 to 10

The operands are already sorted in each term and there are no variable/reciprocal pairs. However, the constant operands of the second term can be consolidated to give +0.300000e+01*x2.

Steps 11 and 12

The variable groups of the respective terms do not match. In fact, each variable group contains just one variable, namely of x1 and x2 respectively. Thus, the reduced form of the statement is:

$$x3 = +0.100000e+01*x1 + 0.300000e+01*x2.$$

Steps 13–15

Note that M=7. At the end of step 15 the array D has the following entries

D[1]={"x5", "+0.100000e+01,*x1", "x1", "", "", 1, 1}
D[2]={"x6", "+0.300000e+01*x2", "x2", "","", 1, 1}
D[3]={"x3", "+0.100000e+01*x1+0.300000e+01*x2", "x1, x2", "", "", 2, 1}
D[4]={"x1", "+0.100000e+01*x1+0.200000e+01*x2, "x1, x2", "", "", 2, 1}
D[5]={"x2", "+0.200000e+01 ", "", "", "", 0, 0}
D[6]={"x1", "+0.100000e+01*x1","x1", "x1", "", 1, −1} (see note)
D[7]={"x4", "+0.100000e+01*x5+0.100000e+01*x6", "x5, x6", "x5, x6", "", 2, 1}

Note that the contents of D[6] just prior to marking it for elimination are shown here for illustration. Since its tag =−1, it refers to an identity statement, which must be eliminated in a later step.

Step 16

No action since no undefined variables were found.

Step 17

At the end of step 17, the array D has the following entries:
D[1]={"x5", "+0.100000e+01*x1", "", "", "", ,}
D[2]={"x6", "+0.300000e+01*x2", "", "", "", ,}
D[3]={"x3", "+0.100000e+01*x1+0.300000e+01*x2", "", "", "", ,}
D[4]={"x1", "+0.100000e+01*x1+0.200000e+01*x2", "", "", "", ,}
D[5]={"x2", "+0.200000e+01", "", "", "", , }
D[6]={"", "", "", "", "", , }
D[7]={"x4", "+0.100000e+01*x1+0.300000e+01*x2", "", "", "", ,}

Notice that the intermediate variables x5, and x6 have been eliminated from the right-hand sides of the statements. No new identities were found at the end of this step, and r=6.

Step 18

The current output variables list at the beginning of step 18 is "x2, x3, x4". At the end of step 18, the array D has the following entries:
D[1]={"", "", "", "", "", ,}
D[2]={"", "", "", "", "", ,}
D[3]={"x3", "+0.100000e+01*x1+0.300000e+01*x2", "", "", "", }
D[4]={"", "", "", "", "", ,}
D[5]={"x2", "+0.200000e+01", "", "", "", , }
D[6]={"x4", "+0.100000e+01*x1+0.300000e+01*x2", "", "", "", ,} and the current output variables list is empty. Notice that only the output variables x2, x3, x4 appear on the left-hand side of the statements (the $v_i$ element of D[i]), and the right-hand sides (the $e_i$ element of D[i]) contain only defined input and output variables.

Step 19

The current output variables list is found to be empty. Move to step 20.

Step 20

The number of statements left in B are 3 (same as the number of output variables) corresponding to x2, x3 , x4. Reconstruct them to produce the new B.
S[1]="x3=+0.100000e+01*x1+0.300000e+01*x2"
S[2]="x2=+0.200000e+01"
S[3]="x4=+0.100000e+01*x1+0.300000e+01*x2"

The new D is given by
D[1]={"x3", "+0.100000e+01*x1+0.300000e+01*x2", "x1, x2", "x2", "", 2, 1}
D[2]={"x2", "+0.200000e+01", "", "", "", 0, 0}
D[3]={"x4", "+0.100000e+01*x1+0.300000e+01*x2", "x1, x2", "x2", "", 2, 1}

Step 21

The rearranged (sorted on v) D is given by
D[1]={"x2", "+0.200000e+01", "", "", "", 0, 0}
D[2]={"x3", "+0.100000e+01*x1+0.300000e+01*x2", "x1, x2", "x2", "", 2, 1}
D[3]={"x3", +0.100000e+01*x1+0.300000e+01*x2", "x1, x2", "x2", "", 2, 1]

Step 22

After repeating steps 1 to 21 for the second block of statements, namely, $$x_1 = x_1 + 2*x_2$$

$$x_3 = x_1 + x_2$$

$$x_4 = x_3$$

$$x_2 = 2$$

A final D for the second block is found to be
D[1]={"x2", "+0.200000e+01", "", "", "", 0, 0}
D[2]={"x3", "+0.100000e+01*x1+0.300000e+01*x2", "x1, x2", "x2", "", 2, 1}
D[3]={"x4", "+0.100000e+01*x1+0.300000e+01*x2", "x1, x2", "x2", "", 2, 1}

The two final arrays D are compared and, as may be seen are identical.

The algorithm described here provides a means for determining if two blocks of assignment statements are equivalent or not. The applications of such an algorithm are, among others, in program verification, program proving, and compiler initiated optimization of source code.

It will be emphasised that the invention is not limited to the specific embodiment described above but includes modifications and developments within the purview of those skilled in the art and limited only by the following claims.

What is claimed is:

1. A computer implemented method of determining, in a computer environment, an equivalence, if any, of two blocks of assignment statements in a computer program for use in compiler optimization of source code, program verification, and like computing tasks, said method comprising the steps of:

(a) forming, for each block of assignment statements, a corresponding array, each array comprising a plurality of elements corresponding to respective ones of the statements and populating the elements with attributes of the statements including an expression at right-hand side of the statement;

(b) processing, in each array, each assignment statement in turn, in an order from a last statement to a first statement, the processing comprising an inspection of each unprocessed assignment statement in turn, in the order from a last unprocessed assignment statement to a first unprocessed assignment statement, to determine if a variable appearing on lefthand side of the unprocessed assignment statement appears on righthand side of the assignment statement being processed;

(c) during step (b), in each array, if the variable appearing on the left-hand side of the unprocessed assignment statement also appears on the right-hand side of the assignment statement being processed, replacing all occurrences of such variable on the right-hand side of the assignment statement being processed, non-recursively, by the right-hand side of the said unprocessed assignment statement;

(d) forming, from each array, a corresponding new block of assignment statements comprising the statements processed according to steps (b) and (c) and not comprising any statements which, after processing, is either an identity (the left and right sides of the statement are identical) or whose lefthand side variable is not an output variable;

(e) creating, from each new block of assignment statements, a corresponding new array, each array comprising a plurality of elements corresponding to respective ones of the statements and populating the elements with attributes of the statements including the expression at the righthand side of the statement;

(f) sorting, in each new array, the array elements in alphabetical order using the output variable name as a key;

(g) comparing the arrays to detect the equivalence of two blocks of assignment statements.

2. A method according to claim 1, including, for each assignment statement in a block, testing the statement for compliance with predetermined rules concerning an applicability of steps (b) and (c), and, if said rules are not complied with, abandoning the method with an error message.

3. A method according to claim 1, whereby step (a) is preceded by a formatting step of the righthand side of each assignment statement according to predetermined rules.

4. A method according to claim 1 whereby in step (d) the righthand side of each included assignment statement is formatted according to predetermined rules.

5. A method according to claim 1, whereby at the conclusion of step (e) if a number of assignment statements is not equal to a number of output variables, abandoning the method with an error message.

6. An apparatus to determine, in a computer environment, an equivalence, if any, of two blocks of assignment statements in a computer program, for use in compiler optimization of source code, program verification, and like computing tasks, said apparatus comprising:

(a) forming means for forming, for each block of assignment statements, a corresponding array, each array comprising a plurality of elements corresponding to respective ones of the statements and populating the elements with attributes of the statements including an expression at righthand side of the statement;

(b) processing means for processing, in each array, each assignment statement in turn, in an order from a last statement to a first statement, the processing comprising an inspection of each unprocessed assignment statement in turn, in the order from a last unprocessed assignment statement to a first unprocessed assignment statement, to determine if a variable appearing on lefthand side of the unprocessed assignment statement appears on righthand side of the assignment statement being processed;

(c) during step (b), in each array, if the variable appearing on the lefthand side of the unprocessed assignment statement also appears on the righthand side of the assignment statement being processed, replacement means for replacing all occurrences of such variable on the righthand side of the assignment statement being processed, non-recursively, by the righthand side of the said unprocessed assignment statement;

(d) forming means for forming, from each array, a corresponding new block of assignment statements comprising the statements processed according to steps (b) and (c) and not comprising any statements which, after processing, is either an identity (the left and right sides of the statement are identical) or whose lefthand side variable is not an output variable;

(e) creation means for creating, from each new block of assignment statements, a corresponding new array, each array comprising a plurality of elements corresponding to respective ones of the statements and populating the elements with attributes of the statements including the expression at the righthand side of the statement;

(f) sorting means for sorting, in each new array, the array elements in alphabetical order using the output variable name as a key;

(g) comparison means for comparing the arrays to detect the equivalence of two blocks of assignment statements.

7. A computer program product including a computer readable medium having recorded thereon a computer program for determining, in a computer environment, an equivalence, if any, of two blocks of assignment statements in a computer program, for use in compiler optimization of source code, program verification, program proving, and like computing tasks, said program comprising:

(a) forming process steps for forming, for each block of assignment statements, a corresponding array, each array comprising a plurality of elements corresponding to respective ones of the statements and populating the elements with attributes of the statements including an expression at righthand side of the statement;

(b) processing steps for processing, in each array, each assignment statement in turn, in an order from a last statement to a first statement, the processing comprising an inspection of each unprocessed assignment statement in turn, in the order from a last unprocessed assignment statement to a first unprocessed assignment statement, to determine if a variable appearing on lefthand side of the unprocessed assignment statement appears on the righthand side of the assignment statement being processed;

(c) during step (b), in each array, if the variable appearing on the lefthand side of the unprocessed assignment statement also appears on the righthand side of the assignment statement being processed, replacement steps for replacing all occurrences of such variable on the righthand side of the assignment statement being processed, non-recursively, by the righthand side of the said unprocessed assignment statement;

(d) forming process steps for forming, from each array, a corresponding new block of assignment statements comprising the statements processed according to steps (b) and (c) an not comprising any statements which, after processing, is either an identity (the left and right sides of the statement are identical) or whose lefthand side variable is not an output variable;

(e) creation process steps for creating, from each new block of assignment statements, a corresponding new array, each array comprising a plurality of elements corresponding to respective ones of the statements and populating the elements with attributes of the statements including the expression at the righthand side of the statement;

(f) sorting process steps for sorting, in each new array, the array elements in alphabetical order using the output variable name as the a;

(g) comparison process steps for comparing the arrays to detect the equivalence of two blocks of assignment statements.

* * * * *

UNITED STATES PATENT AND TRADEMARK OFFICE
CERTIFICATE OF CORRECTION

PATENT NO. : 6,948,161 B2
DATED : September 20, 2005
INVENTOR(S) : Bera

It is certified that error appears in the above-identified patent and that said Letters Patent is hereby corrected as shown below:

Column 11,
Line 8, delete "+0.100000e+01," and insert -- +0.100000e+01 --.
Line 47, delete ", }" and insert -- ,, } --.

Column 12,
Line 12, delete "x3" and insert -- x4 --.

Column 14,
Line 22, delete "program proving".
Line 62, delete "the a;" and insert -- a key; --.

Signed and Sealed this

Twenty-ninth Day of November, 2005

JON W. DUDAS
*Director of the United States Patent and Trademark Office*